United States Patent [19]

Taylor

[11] 4,393,116
[45] Jul. 12, 1983

[54] SHAPED MATERIALS

[75] Inventor: Derek P. Taylor, Essington, near Wolverhampton, England

[73] Assignee: Fastbac Research Limited, West Midlands, United Kingdom

[21] Appl. No.: 170,236

[22] Filed: Jul. 18, 1980

[30] Foreign Application Priority Data

Jul. 24, 1979 [GB] United Kingdom ................. 7925655

[51] Int. Cl.³ .............................. C09J 7/02; C09J 5/02
[52] U.S. Cl. ................................... 428/343; 156/220;
156/230; 156/275.5; 156/307.1; 264/319;
264/347; 428/40; 428/346; 428/349; 156/73.1
[58] Field of Search ................. 428/343, 159, 160, 40;
156/78, 79, 220, 245, 273, 230, 307.1; 264/236,
347, 219, 319

[56] References Cited

U.S. PATENT DOCUMENTS

| | | | |
|---|---|---|---|
| 2,855,021 | 10/1958 | Hoppe | 156/78 |
| 2,946,713 | 7/1960 | Dusina, Jr. et al. | 428/159 X |
| 3,170,832 | 2/1965 | Wilson et al. | 156/245 X |
| 3,256,131 | 6/1966 | Koch et al. | 156/79 X |
| 3,939,294 | 2/1976 | Fieldhouse | 156/307.1 |
| 4,037,008 | 7/1977 | Tugwell | 156/230 X |
| 4,126,661 | 11/1978 | Fulconis et al. | 264/236 X |
| 4,244,908 | 1/1981 | Hirasuna | 264/236 |
| 4,294,782 | 10/1981 | Froehlig | 264/326 X |
| 4,308,184 | 12/1981 | Thoma et al. | 156/307.1 X |

Primary Examiner—Thomas J. Herbert, Jr.
Attorney, Agent, or Firm—Sughrue, Mion, Zinn, Macpeak and Seas

[57] ABSTRACT

A soft permeable material, such as a foamed plastics material or a fibrous material is shaped, and optionally provided with one or more facing layers, by applying to the faces thereof a polyurethane based prepolymer composition under such conditions that a non-tacky coating having latent adhesive properties is formed. The coated material may be stored for a period of several months and subsequently shaped by the application of heat and pressure sufficient to cure the pre-polymer. Facing layers can be bonded thereto simultaneously without the application of additional adhesive substance. The latent adhesive substance may be applied to the permeable material in solution or in the form of a dry film. In the latter case the film may be applied initially to a facing layer. The latent adhesive substance may be used to form reclaimed waste material into a coherent mass which can subsequently be shaped and faced without the application of further adhesive substance.

22 Claims, 3 Drawing Figures

SHAPED MATERIALS

BACKGROUND OF THE INVENTION

1. Field of the Invention

This invention relates to a method of making embossed or contoured articles or materials, such as quilted or embossed fabrics as used for example in upholstery, or pre-shaped panels or cushions used for example for lining the interior or motor vehicles, or articles such as saddles, footwear etc., or again in upholstery. Normally, such articles or materials are of a laminated construction with a facing layer on one side of a relatively soft filler layer and usually, but not necessarily, a backing layer on the other side. The filler layer may be formed from a foamed plastics material or a fibrous material such as wadding, felt or other absorbent material.

2. Description of the Prior Art

Previously known methods of forming such materials and articles can be divided broadly into two categories which may be called 'passive or mechanical' processes on the one hand and 'active or chemical' processes on the other hand.

The 'passive' processes are characterised by the use of pre-formed materials which are simply formed into a laminate and embossed or shaped by operations which can usually be carried out by the user of the materials and articles thus formed. Thus the user can make use of commercially available stock materials and form shaped materials and articles according to his own production requirements.

The 'passive' processes include methods whereby laminated materials of relatively small thickness are formed essentially by securing the several layers together at appropriate positions, either mechanically (e.g. by stitching) or by heat sealing as for example disclosed in U.S. Pat. No. 3,170,832. In such cases, the shape of the embossed pattern is determined by the attachment of the layers over only a very small fraction of the total surface area of the material. The foamed material or other soft material which forms the filler is maintained in a compressed condition in and around such secured areas solely by the attachment of the layers to one another and this limits the depth of pattern that can satisfactorily be embossed, whilst in heat sealing when a foamed material is employed the foamed structure of the material may be destroyed where the sealing takes place, and the facing layer may become glazed.

The 'active' processes are characterised by the use of chemical polymerisation techniques for forming the filler material, or at least a part thereof, in-situ, and to the required shape. These processes can normally only be carried out by the manufacturers of synthetic polymers under very carefully controlled conditions and not by the manufacturers who wish to use the shaped materials and articles thereby produced in the manufacture of their own products.

In one example of such an 'active process', as described in U.S. Pat. No. 2,855,021, shaped articles of foamed plastics materials are formed by allowing the foaming of the plastics material to take place in a suitably shaped die. However, this process requires very expensive dies and involves the use of hazardous chemicals.

An example of a further 'active' process for making embossed laminated materials is described in U.S. Pat. No. 3,256,131. This discloses the use of a foam forming plastics material as a bonding agent for facing layers and a filler of foamed plastics material. The foam forming material is applied to the surfaces of the layers to be bonded together and foaming takes place when the layers are in contact with one another. The foam produced penetrates the cells of the foamed plastics material and causes the facing layer to adhere thereto. If the laminated material is contacted by an embossing die so that the facing layers are substantially brought together until the foaming material is cured, the laminate is thereby formed with an embossed pattern and the shaping of the foamed material is maintained by adhesive of the facing layers. However, this method again utilises hazardous chemicals and is relatively difficult to control since the foam forming material must be applied in carefully monitored quantities. Also this method is only applicable to the manufacture of laminated materials in which a foamed plastics filler material has facing layers thereon. Additionally, the foaming process must be carried out at an elevated temperature and this imposes limits on the material which may be employed as the facing layer.

SUMMARY OF THE INVENTION

In contrast to these known techniques, the present invention provides a method of shaping soft filler materials which is not limited to foamed plastics materials, nor to the production of laminated materials, and does not require expensive shaping dies and does not involve the use, during the shaping process, of any hazardous chemicals such as isocyanates. More particularly, the invention provides a treated material which can be stored and subsequently shaped or embossed simply by the application of heat and pressure and without the use of hazardous chemicals during such operation.

According to one aspect of the present invention soft permeable material is shaped by applying to opposite faces thereof in at least those regions of the material which are to be shaped a substance having latent adhesive capacity, thereafter applying mechanical compressive force to the material so as to impart the desired shape thereto, and holding the material in the desired shape under conditions such that the latent adhesive substance is activated until the adhesive is cured at least to the extent necessary to hold the material in the desired shape.

The latent adhesive substance may be applied to filler material which is in sheet or block form in such a manner as to permeate substantially into the material. In this case, a solution of the substance may be applied to the opposite faces of the filler material by appropriate method, for example by spraying, so that the solution permeates the material, and thereafter the solvent is removed under such conditions that the latent adhesive substance is not activated. A water based polyurethane, particularly an aliphatic polyester/urethane blockpolymer, may be used in an aqueous solvent. Other urethane systems may be used in an organic solvent.

In the case of volatile organic solvents it may only be necessary to allow the solvents to evaporate. In other cases heating may be required, and it has been found particularly beneficial to use an RF heater where water is used as the solvent. Removal of the solvent leaves the substance in a dry, substantially non-adhesive finely divided condition dispersed throughout the superficial areas of the material.

The treated material may be stored in this condition and readily transported. Thus, the initial step of applying the latent adhesive can be carried out at a different site from that at which the filler material is eventually shaped when required. This is a particularly valuable safety factor because it is not necessary to utilise volatile solvents or any hazardous chemicals at the site where the shaping is carried out, and the pre-treated filler material may be manufactured and sold as a raw material which can subsequently be shaped by other manufacturers.

In an alternative approach, the latent adhesive may be applied to the only surface of the filler material instead of permeating into the body thereof. In this case the latent adhesive substance may be applied to the filler material in a dry condition. For example, the substance may be formed into a film, by deposition from a suitable solvent or in any other suitable manner, onto a suitable release paper. Such preformed film may then be applied to the surface of the filler material and the release paper may be retained in position to protect the film until the material is to be shaped.

In either case, the latent adhesive substance is most conveniently of a kind which is activated by heat. We have found that urethane materials, which may be used in an aqueous solution or a non-aqueous solution, are especially advantageous. The components for forming a urethane system may be mixed in a suitable solvent and dissolved. The solvent can then be evaporated at a relatively low temperature to deposit a pre-polymer in the form of a film or coating of a substantially non-tacky nature so that the filler material coated with the pre-polymer can be handled and stored without difficulty. Whilst the pre-polymer deposit is still wet, that is before the solvent has evaporated fully, it possesses a degree of tackiness such that the filler material may be bonded to an appropriate facing material at this stage. Thus the treated filler material may be supplied with a facing material adhered to at least one face thereof by means of the applied pre-polymer system. The bond thus formed in practice is quite sufficient to enable the laminated filler material to be stored and handled without separation of the facing material from the filler material.

If no such facing material is applied at this stage, after the solvent has been evaporated it is possible to return the pre-polymer to its initial tacky condition by applying a suitable solvent. In this way, a facing layer can thus be adhered to the filler material at an intermediate stage. In this case, the impregnated or coated filler material can simply be wiped with a solvent applicator immediately before the facing material is applied, and then stored for a further period of time as necessary. Thus it is possible to build up a supply of treated, unfaced filler material and apply the facing material subsequently at a different site, but still without applying the final shaping to the filler material.

In order to impart the desired shape to the filler material, whether with or without facing layers, it is only necessary subsequently to heat the material to a higher temperature sufficient to cause polymerisation of the urethane system to be brought to completion. During such final, curing process the filler material may be held in its desired shape by any appropriate means until such time as the cure is complete. The filler material is then irreversibly bonded and held in shape.

The necessary heat for activation of the adhesive may be applied externally by any suitable form of heating, but according to a further feature of the invention, the required heat may be generated internally of the material. In particular, this may be achieved by the application of vibrational energy at high frequency (ultrasonics). Such energy may be applied by means of a shaped transducer (or horn) which contacts the filler material in the areas where it is to be embossed, and simultaneously applies the necessary mechanical pressure to hold the material in the desired compressed condition for a period of time sufficient for the adhesive to become effective.

Instead of ultrasonic energy, high frequency electromagnetic radiation, for example gamma rays may be utilised, or high energy particle radiation, such as neutron or electron bombardment may be employed. In such cases, of course, care must be taken to ensure that the filler material used is not damaged by the radiation employed. In general, plastics materials utilising aromatic curing agents are to be preferred to those utilising aliphatic curing agents.

In all the above cases, the filler material may be formed to the desired shape without the provision of any facing and/or backing layers. This is particularly advantageous since it enables the shaped product to be utilised in a much wider variety of ways since a much wider variety of covering materials may be applied thereto after shaping, than would be the case if the covering materials had to be selected so as to withstand the conditions of the shaping process. Thus, a facing layer, for example of PVC, may be applied by a spraying process after the filler material is shaped. Alternatively, a synthetic or natural fabric may be bonded to the shaped surface of any suitable means in a subsequent operation, or a loose fabric cover may be employed.

The process in accordance with the invention may with advantage be utilised for the production of relatively thin laminated materials, as used for example as linings or paddings, but it can also be applied to large articles such as shaped seat cushions, or indeed the entire seat cushion and back of a chair formed as a one-piece moulding, if appropriate with arms or side pieces.

Moreover, since the shaping process is carried out under very mild conditions, the materials utilised for shaping the filler material do not have to be selected so as to be resistant to high temperatures or dangerous chemicals. All that is necessary is that the shaping elements have the requisite mechanical strength to apply the necessary pressure to the filler material, and afford a surface from which the shaped material can readily be separated, if necessary by the application of a suitable release agent.

Instead of using a mould cavity which completely defines the external shape of the article, in many cases it is possible to start with a block of filler material of predetermined size and shape which can readily be cut from stock and then impart the desired final shape to this block by the application of simple openwork formers which engage the filler material only at the points where embossing is required, since the surface of the material between such points, by virtue of the resilience of the material, naturally adopts a contoured form.

When it is desired to form a fairly thick article by this method, with impressions not extending through the full thickness of the filler material, two or more layers of the filler material may be utilised in such a manner that the only layer of filler material acts as a backing layer for the outermost layer of filler material and the pre-polymer coatings at the opposed faces of the outermost layer are brought together. The other layer of filler material may itself, if necessary, be covered at the opposite side by a backing layer proper. In this way, the indentations formed during the shaping may extend through only the thickness of the outermost layer of filler material. In this case, the outer layer of filler material may be relatively soft, whilst the inner layer is more rigid.

The above process is applicable whether the latent adhesive material is applied to the filler in the form of a film or a solution. Nevertheless, we have found that when the solution is applied directly to the filler, it is possible to form impressions which do not extend through the whole thickness of a single layer of filler material if the solvent is not completely evaporated after the solution is applied and before the shaping process is carried out. The presence of residual solvent enables the pre-polymer to penetrate into the filler material during the final curing process to an extent sufficient to enable the fully cured polyurethane to hold the filler in shape without bringing together two layers of pre-polymer from opposite sides of the filler. When the pre-polymer is applied in the form of a film, or a solution which is fully evaporated, a similar result may be achieved by the application of a suitable solvent to the coated filler material prior to the shaping process. Thus, both "full depth" and "partial depth" embossing are possible.

Whilst the pre-polymer is necessarily applied to the filler material in a case where that material is to be shaped without the application of a facing layer, it is alternatively possible to apply the pre-polymer to the facing material, rather than to the filler material, in a case where the product consists of a filler material having a facing material thereon.

Thus, instead of applying the pre-polymer film or solution directly to a layer of filler material, it is alternatively possible to apply it to a layer of facing material. It is particularly convenient to form a pre-polymer film directly on a layer of an appropriate facing material, instead of on a layer of a release paper as previously mentioned. In this case, the treated facing material may be manufactured and supplied as a stock material for use with appropriate filler materials.

A further feature of the present invention is that a latent adhesive material may be utilised in the production of a "reconstituted" filler material, which is then itself ready to receive appropriate facing materials and-/or to be shaped. Thus, various fibrous or particulate scrap materials may be sprayed lightly with the latent adhesive solution and brought together under light pressure so as to form a coherent body under conditions such that the adhesive material is not fully cured. The latent adhesive material is then available at the surfaces of such a body for the subsequent adhesion of facing layers, and the body can be shaped simply by the application of pressure and heat sufficient to raise the temperature to a level at which the latent adhesive material is fully cured.

The invention will now be described with reference to the following Examples. Example 1 illustrates a method of preparing the pre-polymer solution. Example 2 illustrates the formation of a dry film from such solution. Example 3 illustrates the use of such film. Example 4 illustrates the direct application of the solution to a filler material. Example 5 illustrates the manner in which such material is shaped, or embossed. Example 6 illustrates the use of an alternative solution.

EXAMPLE 1

Prepolymer Solution

A polyurethane pre-polymer solution is prepared by mixing the required polyol and isocyanate components and adding solvent.

A suitable polyol, such as that available under the designation CAPRA 520 from Laporte Industries, is placed in a reactor fitted with stirrer, and methods of heating and cooling and a condenser.

The polyol is heated under a nitrogen atmosphere to 90° C. and a suitable isocyanate, such as that available from Upjohn Corp. under designation ISONATE 143L, at room temperature is added with stirring. The mixture may contain between 70% and 92% polyol and correspondingly 8% to 30% isocyanate.

The temperature rises to about 100° C. within 20–30 minutes, and the temperature is maintained for a further 30 minutes. Thereafter it is cooled to about 60° C. Sufficient methylene chloride is added to obtain a solids content of up to 70% and the solution is stored under nitrogen in sealed drums. Alternative solvents which may be employed include toluene/methyl ethyl ketone mixtures.

A pre-polymer solution for use in the invention may be made by mixing at room temperature the following components in the weight percentages indicated, followed by the addition of a suitable solvent to obtain a 70% solution which is further diluted for use. The components for such solution are:

(a) a hydroxyl terminated polyester based polyurethane resin, such as that described above or that available from Dicas Chimie (France) under designation TS 79 (at least 65%)

(b) a thermoplastic polyester resin, such as that available from Dermal Research Ltd. (England) under designation DR 135 (up to 25%)

(c) a cross-linking agent comprising an aminoplast resin system, such as glyoxal mono urein available from D.I.C. Japan under the designation BECKAMINE LKS (up to 5%)

(d) a catalyst such as a para sulphonic acid solution available from Dicas Chimie under designation CT3 (up to 5%)

Alternative pre-polymers for use in such solutions, and which are commercially available, include URAFLEX M126 from Synthetic Resins Ltd., and MORAD 401 from Morton Williams Ltd.

EXAMPLE 2

Forming Latent Adhesive into Dry Film

Polyurethane systems as described in Example 1 are formed into dry films by application of the solution to a coated release paper. The preformed film is stable under normal conditions and can be stored in that condition for many months. When required for use, the film is applied to the face of a slab of soft filler material which may be foamed plastics material or a fibrous material which may be made of plastics or natural materials. The coated filler material thus formed is also stable and may be stored as necessary. The latent adhesive films were stored for periods exceeding five months and found to be perfectly suitable in all types of lamination as previously outlined when cross linking utilising the methods described hereinafter. When the material is to be used, the release paper is stripped off and then it may be shaped in the manner as hereinafter described, if desired with the addition of layers of appropriate facing materials.

In practice a double or single coated release paper has imparted onto the surface thereof sufficient solution to give dry weight film from 5 grams to 300 grams per square meter according to the intended use. The deposited solution is then heated up to 80° C. to flash off solvent leaving a non-tacky adhesive film on the release paper. The characteristics of the adhesive film are such that it can subsequently be laminated to a substrate and be cross linked whilst held under pressure and at a temperature above 90° C., in order to completely and irreversibly cure the resin. In a similar manner a film can be formed directly on a facing material which is subsequently to be adhered to the filler material.

EXAMPLE 3

Use of Latent Adhesive in Film Form

This method is ideal for both small batch and large volume production. The film, which can be produced in varying dry weight gauges, can be used directly from the roll in sheet form or pre-cut for more intricate small components. The method of operation is illustrated by way of example with reference to the production of an embossed component 2 meters by 1 meter in area and 40 mm in thickness.

In this example the substrate is polyurethane foam of sheet thickness 20 mm, two pieces of which are bonded together to form the finished component. One piece of foam requires the application to both sides of film produced as described in Example 2 with a coating weight equal to 100-140 grams per square meter. This can be achieved by hand pressure or the use of a light rubber roller for trial purposes. The other piece of foam requires the application of a lighter film, at a weight of 50-70 grams per square meter, in a similar manner but only on one face. The uncoated face of this piece is placed in contact with one of the coated faces of the first piece. Under commercial production conditions the substrate film sandwich would be fed through a pre-warm stage and then through pinch rollers. The heat required for this stage would be sufficient to raise the temperature to 35° to 40° C. This allows the film to "tack" into the substrate.

If a layer of facing material is to be applied to the foam substrate, the lighter film may be applied to the facing material rather than to the second piece of foam substrate. The "sandwich" of facing material with adhesive film, untreated substrate, and the substrate with adhesive film on both surfaces, can be pre-bonded in a sheet form. This can be achieved by heating to 60° C. at pressure of 80 psi for a period of 30 seconds. The sheet can then be stacked for final forming operation.

The procedure for embossing the substrate is then carried out as described in Example 5 following.

EXAMPLE 4

Use of Pre-Polymer Solution in Organic Solvent

A block of foamed or fibrous filler material is treated with a solution of a polyol/isocyanate system of a hydroxyl terminated polyester based polyurethane resin in an organic solvent prepared as described in Example 1. The filler material is then dried at a temperature not exceeding about 80° C.

The product is essentially non-adhesive and may be stored in contact with similarly treated material for a period of several months without undue adherence.

When the material is to be shaped, it can be compressed and heated to a temperature of 90° C. or greater in any appropriate manner, as hereinafter described, to produce a stable contoured product. Facing layers of any appropriate materials may simultaneously be secured to the filler material during the shaping process, merely by placing such layers in contact with the filler material prior to compression and heating thereof.

The solution has been found to be ideal for spraying through an airless dispenser pump and conventional hand spray equipment. The majority of solvent content is dispersed into the spray booth and subsequently extracted. An automatic spray system may be used to coat both sides of the substrate in one operation, and an inline drying processor may be provided to flash off the solvent content in order that the substrates can be stored until required.

Handspraying may be employed as for example in the production of a simple one-form component of 20 mm thickness with a fabric (or PVC) surface finish on both faces. The substrate thus requires to be coated with the solution on both surfaces. It has been found that the application of a light coat to the surface onto which the covering is to be bonded achieves a totally acceptable product. By handspray this is achieved by passing the spray gun in one traverse across the foam to deposit 50-70 grams of adhesive per square meter. The reverse side of the substrate is coated by first a horizontal and then a vertical traverse of the spray gun, to apply a coating of 100/140 grams per square meter. It has been found by trial that the method of sequential vertical and horizontal passes of the gun is preferable to applying one heavy coat as this tends to trap the solvent within the layer of adhesive.

The coating of the filler material may alternatively be carried out by automatic spraying and drying procedures. In this case the spraying is carried out in a vertical plane with spray guns being fed from separate airless pumps so that the equipment can be set to coat at two different weights. i.e. 50-70 grams and 100-140 grams. Built into the systems of coating is an in line dryer for the removal of the solvents. After the spraying operation the substrate moves automatically through the dryer which is preset at 45° C. The dried material can then be stored for ultimate production requirements, and it has been found that material coated 5 months previously performs with the same results as freshly coated and dried material.

The adhesive solution may also be deposited using roller coating equipment. Typically a coater is fed from 200 kg drums of adhesive through airless pumps into a reservoir produced by the doctor blade and coating rollers, both the rollers and doctor blades are made of stainless steel for ease of cleaning. The dispense gap between roller and blade on both top and bottom rollers is controlled by micrometer adjustment to allow varying coating weights to be applied to opposite sides of the substrate at one operation. In using the roller coater and efficient extraction, the solvent content is further reduced before passing through a warm dryer. The solution may similarly be applied to a release paper to form a dry film as in Example 2.

The treated filler material is substantially non-tacky and can be stored for several months without deterioration of the applied latent adhesive. The adhesive can be activated by heating to above 90° C. and the filler material can be shaped by the application of pressure while the pre-polymer is fully and irreversibly cured at this higher temperature, as described in the following Example.

EXAMPLE 5

The coated substrate as produced in Example 4 is faced and shaped as follows:
(a) After pre-warming the die a layer of facing material is laid face surface down onto the die.
(b) The coated foam is laid onto the die with the lighter coating against the facing material.
(c) To achieve a fine definition of the form it is desirable that a fine layer of scrim cloth, such as Cerex or Lutrabond 3020, is laid onto the upper face of the coated foam.
(d) The whole is then covered with a release paper, so that the adhesive does not stick to the surface of the press. A double sided silicone release paper has been proved to be satisfactory.
(e) The whole is then put into the heated plattern press. The press is preset to the required temperature, pressure and time. For a simple forming operation on a sheet of treated foamed plastics material of 20 mm thickness and say 2 meters by 1 meter in area, with a design pattern on some 20% of the face area, the following settings would be used:
Temperature—95° C.
Time—2½ minutes
Pressure—500–550 p.s.i.

Alternative methods of heat and pressure which have been particularly satisfactory include using R.F., H.F. and ultrasonic welding presses to reduce the time for cross linking considerably. In each case there has been no difference discovered between using the latent adhesive as a film directly onto substrate, or transferring the latent adhesive film from the release paper onto the substrate and then H.F., R.F. or ultrasonic welding to give the necessary definition and lamination. Additionally shaping may be effected by vacuum forming techniques and infra-red heating.

An important feature when using any of the methods shown with latent adhesive is that existing Ultrasonic or Radio frequency and high frequency equipment can be used. Satisfactory trials have been carried out using the following equipment.
Ultrasonic—Elorac—Ultrasonic precision press USP 300.
Pressure—300 KP with 6 ATM supply.
Weld time—adjustable from 0.1 to 3 seconds, for the trial 1.5 seconds has been used.
Radio Frequency—Radyn UP3B/202CW with a Radyne 202CW or 300CW generator.
Air pressure required—60/100 PSI
Platen pressure at max: air pressure=8000 lbs.

EXAMPLE 6

Use of Pre-polymer Solution or Aqueous Solvent

A block of foamed or fibrous filler material is sprayed with an aqueous solution of a water soluble polyurethane, specifically an aliphatic polyester/urethane block-polymer which has the characteristic of irreversible conversion to a water resistant form by heat drying. Suitable aqueous solutions are available under the designation URAFLEX 578 from Synthetic Resins Ltd. or HYDRAN W140 from Dicas Chimie of Paris. The solution is applied to the filler material in any convenient manner, and the filler material is then dried at a temperature not exceeding about 80° C. The treated material thus produced has similar properties to those described in Example 3, and can be faced or shaped as described in Example 4.

Whilst in the above examples the latent adhesive, pre-polymer material is applied over the whole surface area of the filler material, it will be appreciated that it would alternatively be possible to apply the latent adhesive to only selected areas of the filler material, where embossing is required. Thus the solution may be applied in spots by means of needles, or in areas of any desired shape by spraying through a template, or the dry film may be applied as strips or shaped pieces.

BRIEF DESCRIPTION OF THE DRAWINGS

As will be evident from the above examples, the method in accordance with the invention is very versatile, as will be evident from the accompanying drawings in which:

As shown in FIG. 1, a sheet or slab 10 of a soft filler material (which may be a foamed plastics material, or a fibrous, plastics or non-plastics material, for example) may be treated as indicated by arrow (a) so as to be coated with a polyurethane pre-polymer solution which is deposited on one or both faces where indicated at 11. In a subsequent stage indicated by arrow (b), the coated filler material 10 is dried by heating it to a temperature less than about 80° C. to produce a treated substrate material 20 having on the faces thereof non-tacky films 12 of latent adhesive material. It will be understood that when the material is produced in this way, the latent adhesive material also penetrates into filler material 10 from the surfaces thereof. The treated material 20 may be stored in this condition for a period of many months without deterioration, and when required it may be shaped or embossed as indicated by arrow (c) simply by heating to a temperature above about 90° C. and applying pressure to shape the material. This produces an unlaminated shaped product 30, the shape of which is fully stable.

Figure 1:
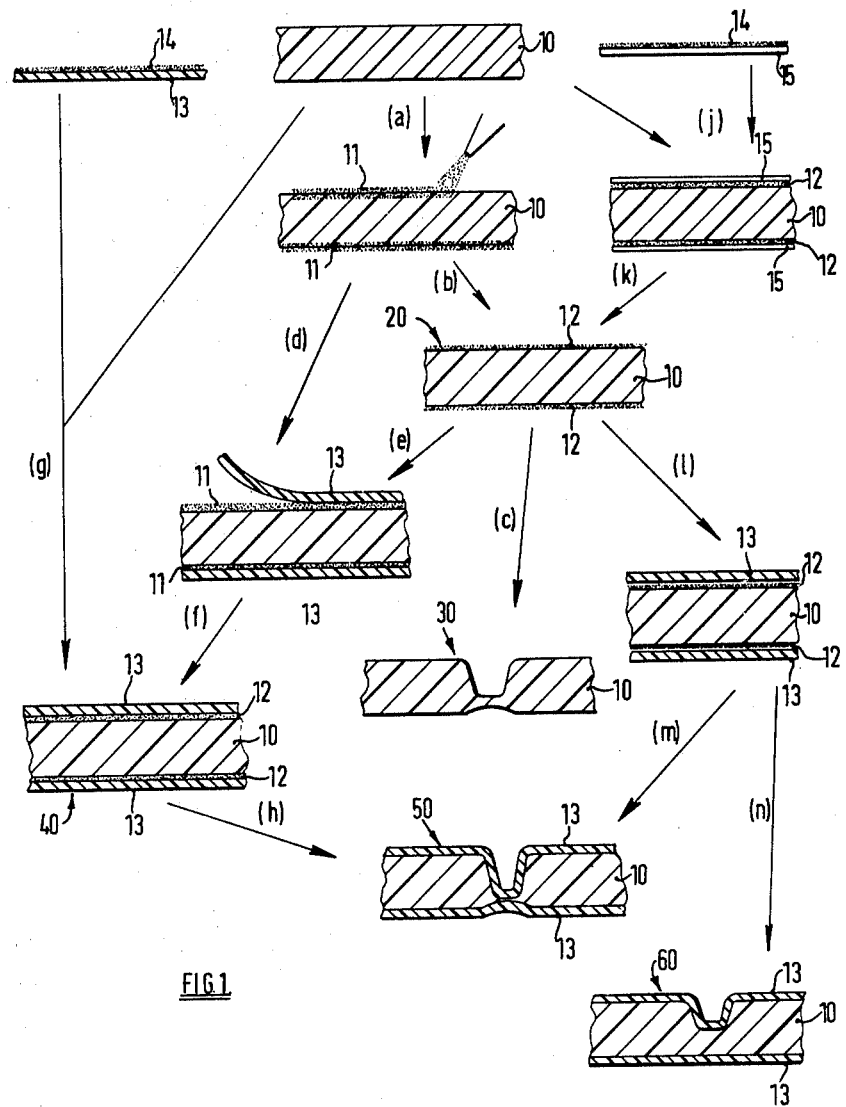
FIG. 1 illustrates schematically the various steps in which the invention may be carried out.

Instead of immediately drying the pre-polymer solution as in step (b), it is alternatively possible to apply appropriate facing materials 13 to one or both treated faces of the filler material 10 as indicated by arrow (d) whilst the surfaces are still wet. Alternatively, layers of facing material 13 may be applied to the treated material 20 as indicated by arrow (e) by wiping the faces of the treated filler material with a suitable solvent before the facing material 13 is applied. Thereafter, the faced filler material may be dried at a temperature less than about 80° C., as indicated by arrow (f) to produce a flat intermediate laminate 40 having layers 13 of facing material lightly adhered to the filler material 10 by means of the dried pre-polymer layers 12. This intermediate laminate may, like the treated material 20, be stored for a period of many months without deterioration.

A similar intermediate laminate may alternatively be produced by applying the solution of pre-polymer directly to the facing material 13 and drying it at a temperature below about 80° C. so as to form thereon a substantially non-tacky film 14. The coating material is then, as indicated by arrow (g) applied to the untreated filler material 10 and the composite sandwich is heated to a temperature less than 80° C. in order to bond the facing layers 13 lightly to the filler material 10.

The flat intermediate laminate 40 may subsequently be embossed as indicated by arrow (h) by heating it to a temperature above about 90° C. and applying pressure thereto in order to cause the polyurethane to be fully cured and produce an embossed sheet 50 wherein the facing material 13 is firmly bonded to the filler material 10 by the cured polyurethane, and at the same time the filler material is bonded and maintained securely in the embossed condition.

In a further alternative, the pre-polymer solution may be deposited on a release paper 15 to form a film 14, and as indicated by arrow (j) such films may be applied to the faces of the filler material 10. The coated material may then be heated to a temperature not exceeding about 80° C. and the coated filler material may be stored in this condition, or after the release paper has been removed, as indicated by arrow (k) to produce a treated material essentially as indicated at 20, although in this case the pre-polymer film is confined to the surfaces of the filler material 10.

Whether the treated material 20 is formed by the route (a), (b) or (j), (k), it is also possible to apply layers of facing material 13 to the treated filler material at the same time as the embossing operation is carried out. This is indicated by arrow (l) where the facing material 13 is shown loosely assembled with the treated filler material 10. Thereafter, the loose sandwich is heated and shaped, as indicated by arrow (m) to produce the laminated embossed product as indicated at 50.

It will be seen that the embossed pattern extends effectively through the entire thickness of the filler material 10 in both the unlaminated product 30 and the laminated product 50. However, if it is desired to produce a product in which at least some of the embossed areas do not penetrate through the full thickness of the filler material 10, this can be achieved in two ways. Firstly, as described in Example 3, two or more layers of filler material may be employed so that there is an intermediate interface at which the pre-polymer, latent adhesive material is present. In this case, the embossing die may be so arranged that the surface of the filler material is indented only to a sufficient extent to bring it into contact with such interface.

Alternatively, however, we have found that a similar effect can be achieved using only a single layer of filler material 10 if the embossing operation is carried out immediately after moistening the applied pre-polymer layer 12 with an appropriate solvent. Particularly where the pre-polymer was initially applied to the filler material in solution, rather than as a dry film. The application of solvent immediately before the embossing stage enables the pre-polymer to migrate from the surface of the filler material so that "partial" embossing is possible as indicated by arrow (n) in FIG. 1.

Whilst, in FIG. 1 facing material 13 is shown applied to both sides of the filler material 10, it will be appreciated that such facing material can be applied on only one side, or indeed omitted altogether as shown by the unlaminated product 30. Where the product is formed in an unlaminated state, it will be appreciated that coatings of suitable facing materials may subsequently be applied in any convenient manner, should this be desired.

The treated filler material 20, the flat intermediate laminate 40, the treated facing material 13 with the film 14 of pre-polymer thereon, and the film 14 of pre-polymer on release paper 15 are all stable products which may be manufactured under the carefully controlled conditions necessary where hazardous chemicals and inflamable solvents are used, and then held in stock for a period of many months. They can readily be transported and can be embossed when required, without the safety precautions necessary during the initial treatment of the materials with the pre-polymer solution. However, even the pre-polymer solution may itself be stored quite readily, and used without the stringent safety precautions that are required in previously known methods where polyol and isocyanate are actively reacted to produce a foamed polyurethane for bonding a facing material to a foamed plastics material and simultaneously shaping the laminated product.

Figure 2:
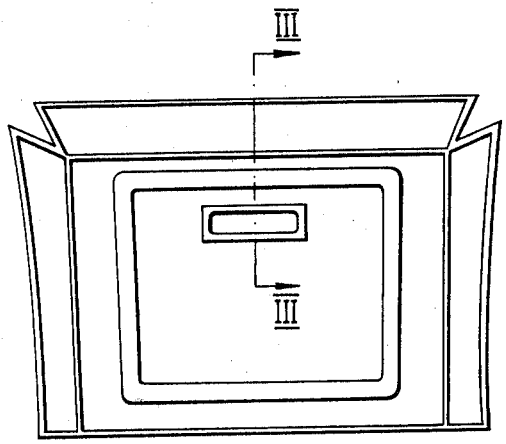
FIG. 2 shows in plan view a typical embossed, laminated component which may be formed.
Figure 3:
FIG. 3 is an enlarged cross-section on the line III—III of FIG. 2.

FIG. 2 illustrates a typical embossed panel which can be formed by the method of the present invention, and as can be seen from FIG. 3, it is possible to produce such panels in complex cross-sections which would not readily be possible by other methods.

A further development of the present invention utilises filler material which is itself constituted by particles and/or fibres which are bonded together into a coherent body by means of the pre-polymer solution. In particular, granules of reclaimed waste plastics foam can be sprayed with the pre-polymer solution and formed into a sheet or block which directly serves as treated filler material as indicated at 20 in FIG. 1 of the accompanying drawings. Reclaimed waste foam in the form of crumbs or granules is allowed to pass through two fans of the pre-polymer solution so that each particle is effectively coated with the solution. The coated particles are then passed between rubber coated rollers which compact the particles together whilst the temperature is maintained below 80° C. so that a sheet of pre-treated foamed plastics material is produced. By controlling the amount of reclaimed waste material fed into the rollers, and the gap between the rollers, it has been found possible to vary the density of the finished sheet. The sheet as it leaves the rollers is then dried by warm air, again at a temperature not exceeding about 80° C., to flash off the remaining solvent, and it can then be stored until required.

In a similar manner fibrous material may also be formed into a pre-treated sheet.

Instead of forming such reclaimed material into sheets, it is alternatively possible to form it into blocks of predetermined size. In this case, the reclaimed material is again sprayed with a pre-polymer solution and then fed into a wooden mould which is lined with silicone release paper. The treated material is then compressed within the mould to produce a block of material of required density, and the compressed block is then dried and stored. The block can then be used for the production of relatively bulky components by shaping it directly by the application of heat and pressure, with or without the addition of facing materials. Alternatively, the block can be cut into sheets of predetermined thickness, and because the latent adhesive, pre-polymer material extends throughout the entire thickness of the block, each face of such sheets is conditioned ready for lamination and embossing without the application of any further adhesive material.

I claim:

1. A soft permeable material having on at least one face thereof a coating of a substance having latent adhesive capacity to form a treated material, said substance containing a pre-polymer and which under normal conditions is stable but is activated by heat alone at a temperature above about 80° C. to undergo a chemical reaction and act as an adhesive forming a strong permanent bond, whereby said treated material may be shaped by applying mechanical compressive force so as to impart the desired shape thereto under the application of said heat such that the latent adhesive substance is activated and cured to the extent necessary to hold said treated material in the desired shape, wherein said treated material can be stored for several months, and wherein the substance is substantially non-tacky prior to being activated but is irreversibly converted to a strong adhesive after activation and curing.

2. A material according to claim 1 having on at least one side thereof a facing layer lightly adhered thereto by said latent adhesive substance.

3. A material according to claim 1 formed from reclaimed particulate and/or fibrous matter lightly adhered into a coherent mass by said latent adhesive substance.

4. A facing material having thereon on one face thereof a dry film of a substance having latent adhesive capacity to form a treated material, said substance containing a pre-polymer and which under normal conditions is stable but is activated by heat alone at a temperature above about 80° C. to undergo a chemical reaction and act as an adhesive forming a strong permanent bond, whereby said treated material may be applied to the surface of a soft permeable material and bonded thereto whilst said soft permeable material is shaped by the application of mechanical compressive force so as to impart the desired shape thereto under the application of said heat such that the latent adhesive substance is activated and cured to the extent necessary to hold said soft permeable material in the desired shape and bond said facing material thereto, wherein said treated material can be stored for several months, and wherein the substance is substantially non-tacky prior to being activated but is irreversibly converted to a strong adhesive after activation and curing.

5. A method of shaping a soft permeable stock material by the steps of
(a) applying to opposite faces of said material in at least those regions of said material which are to be shaped a substance having latent adhesive capacity to produce a treated stock material which can be stored, said substance containing a pre-polymer and which under normal conditions is stable but is activated by heat alone at a temperature above about 80° C. to undergo a chemical reaction and act as an adhesive forming a strong permanent bond, and
(b) thereafter applying mechanical compressive force to said treated material so as to impart a desired shape thereto and holding said treated material in the desired shape while applying said heat such that the latent adhesive substance is activated until the latent adhesive substance is cured at least to the extent necessary to hold said treated material in the desired shape and produce a shaped product,
(c) wherein the treated material can be stored for several months, and wherein the applied substance is substantially non-tacky prior to being activated but is irreversibly converted to a strong adhesive after activation and curing.

6. A method according to claim 5 wherein the latent adhesive substance is applied to said material in a solution which permeates into said material, and thereafter the solvent is removed to form a coating of said substance which penetrates into said material.

7. A method according to claim 5 wherein said material is formed from particulate and/or fibrous matter which is lightly adhered by application of a solution of said latent adhesive substance, and compressed into a coherent mass, the solvent being removed, and the product having said latent adhesive substance exposed at its surface.

8. A method according to claim 5 wherein the latent adhesive substance is activated by the use of high frequency vibrational energy.

9. A method according to claim 5 wherein the latent adhesive substance is activated by the application of high frequency electromagnetic radiation or high energy particle radiation.

10. A method according to claim 5 wherein the latent adhesive substance comprises a urethane pre-polymer which will not cross link rapidly at temperatures below 80° C. and is stable over long periods of time at normal temperatures, but will cross link rapidly at temperatures above 90° C.

11. A method according to claim 5 wherein the latent adhesive substance is formed into a dry film and said film is applied to the surface of said material to form a coating.

12. A method according to claim 11 wherein the film of latent adhesive substance is formed on a release paper and thereafter transferred to said material.

13. A method according to claim 5 wherein a facing layer is applied to at least one face of said material and bonded thereto during the shaping process.

14. A method according to claim 13 wherein the facing layer is applied to said material immediately after the latent adhesive substance and is thereby light adhered to said material to form a faced treatment material, and is subsequently strongly adhered during the shaping process to form a laminated shaped material.

15. A method according to claim 13 wherein the facing layer is applied to said treated material at an intermediate stage after application of a suitable solvent to the latent adhesive substance so that it is thereby lightly adhered to said material to form an intermediate laminate, and is subsequently strongly adhered during the shaping process.

16. A method according to claim 13 wherein the facing layer is applied to said treated material immediately prior to the shaping process and is adhered strongly to said material during the shaping process.

17. A method according to claim 13, wherein the latent adhesive substance is formed into a dry film on said facing layer and said facing layer is applied to said material together with said film.

18. A method according to claim 5 wherein, during the shaping process opposite faces of said material are brought close enough together to cause the latent adhesive substance at one face to come into contact with said substance at the other face in regions corresponding to the desired shaping to produce a shaped material which is embossed through substantially its full thickness.

19. A method according to claim 18 wherein two or more layers of said material are bonded together by the latent adhesive substance and during the shaping process the outer face of one such layer is brought into the proxmity of the interface between such layers in the regions corresponding to the desired shaping at that face, so that in such regions the layers of said material are embossed through only part of their total thickness.

20. A method according to claim 5 wherein the shaping process is carried out whilst a suitable solvent for the latent adhesive substance is present, and in regions corresponding to the desired shaping of said material the said material is impressed through only part of its thickness, so that in such regions said material is embossed through only part of its thickness.

21. A method according to claim 20 wherein said latent adhesive substance is applied to said material in a solution and the solvent is only partially removed.

22. A method according to claim 20 wherein a solvent for said latent adhesive substance is applied to said treated material immediately prior to the shaping process.

* * * * *